United States Patent
Kurasawa et al.

(10) Patent No.: US 9,389,456 B2
(45) Date of Patent: Jul. 12, 2016

(54) LIQUID CRYSTAL DISPLAY

(71) Applicant: Japan Display Inc., Tokyo (JP)

(72) Inventors: Hayato Kurasawa, Kanagawa (JP);
Masashi Mitsui, Kanagawa (JP)

(73) Assignee: Japan Display Inc., Tokyo (JP)

( * ) Notice: Subject to any disclaimer, the term of this patent is extended or adjusted under 35 U.S.C. 154(b) by 90 days.

(21) Appl. No.: 13/740,896

(22) Filed: Jan. 14, 2013

(65) Prior Publication Data

US 2013/0235313 A1 Sep. 12, 2013

(30) Foreign Application Priority Data

Mar. 6, 2012 (JP) .................................. 2012-049153

(51) Int. Cl.
*G02F 1/1335* (2006.01)
*G02F 1/1333* (2006.01)
*G02B 5/02* (2006.01)

(52) U.S. Cl.
CPC .... *G02F 1/133553* (2013.01); *G02F 1/133504* (2013.01); *G02F 2203/02* (2013.01)

(58) Field of Classification Search
CPC .......... G02F 1/134336; G02F 1/13439; G02F 1/133555; G02F 1/133553; G02F 2203/02; G02F 2203/09; G02F 2201/12; G02F 2001/133557; G02F 1/155; G02F 1/133504; G02F 1/133606; G02F 1/133611; G02F 2201/305; G02F 2001/133507; G02F 2203/03; G02F 2001/134345; G02F 2203/30; G02F 5/0257; G02F 2201/123; G02F 1/133536; G02F 1/1335; G02F 2001/133567; G02F 1/133533; G02F 1/133345; G02F 1/157; G02F 1/133557; G02F 1/133562; G02F 2201/17; G02F 2201/48; G02F 2203/023; G02F 2203/026; G02F 2001/133357; G02B 5/0278; G02B 6/0051; G02B 5/0268; G02B 5/0257; G02B 5/02; G02B 5/0236; G02B 5/0247; G02B 5/0242; G09G 2300/0456
USPC ............. 349/139, 141, 162, 112, 66, 85, 144, 349/113, 122, 138, 158; 362/355, 588; 348/671
See application file for complete search history.

(56) References Cited

U.S. PATENT DOCUMENTS 6,424,395 B1 * 7/2002 Sato ..................... G02B 5/0236
349/112
2006/0215082 A1 * 9/2006 Nakano ......................... 349/113

(Continued)

FOREIGN PATENT DOCUMENTS

CN 101071244 11/2007
CN 101688994 3/2010

(Continued)

OTHER PUBLICATIONS

Translation of Office Action issued in connection with Taiwan Patent Application No. 101142102, dated Jan. 19, 2015. (8 pages).

(Continued)

*Primary Examiner* — Paisley L Arendt
*Assistant Examiner* — Angela Davison
(74) *Attorney, Agent, or Firm* — K&L Gates LLP

(57) ABSTRACT

A liquid crystal display which is a reflective liquid crystal display displaying an image by controlling reflectance of ambient light includes: a front substrate; a rear substrate; and a liquid crystal material layer disposed between the front substrate and the rear substrate, wherein the rear substrate is provided with a plurality of reflective electrodes formed on a surface side opposite to the liquid crystal material layer, and a specular light reflecting member reflecting ambient light which is directed to a rear surface side of the rear substrate through a gap between the adjacent reflective electrodes toward the front substrate side.

11 Claims, 12 Drawing Sheets

(56) References Cited

U.S. PATENT DOCUMENTS

| | | | | |
|---|---|---|---|---|
| 2010/0171912 A1* | 7/2010 | Inoh | .................... | G02F 1/13718 349/113 |
| 2010/0225855 A1* | 9/2010 | Lu | .................................. | 349/96 |
| 2011/0222004 A1* | 9/2011 | Kim | ...................... | G02F 1/1393 349/106 |
| 2011/0234958 A1* | 9/2011 | Imayama et al. | ............. | 349/139 |

FOREIGN PATENT DOCUMENTS

| | | |
|---|---|---|
| JP | 10-301106 | 11/1998 |
| JP | 2004-233532 | 8/2004 |
| JP | 2005-148424 | 6/2005 |
| JP | 2005-202433 | 7/2005 |
| JP | 2010-122695 | 6/2010 |
| JP | 2011-185969 | 9/2011 |
| TW | 422930 | 2/2001 |
| TW | 517871 | 1/2003 |

OTHER PUBLICATIONS

Notice of Rejection issued in connection with Japanese Patent Application No. 2012-049153, dated Mar. 3, 2015. (7 pages).

* cited by examiner

LIQUID CRYSTAL DISPLAY

CROSS REFERENCES TO RELATED APPLICATIONS

The present application claims priority to Japanese Priority Patent Application JP 2012-049153 filed in the Japan Patent Office on Mar. 6, 2012, the entire content of which is hereby incorporated by reference.

BACKGROUND

The present disclosure relates to a liquid crystal display. More specifically, the present disclosure relates to a reflective liquid crystal display which displays an image by controlling the reflectance of ambient light.

A reflective liquid crystal display includes a pixel electrode which reflects ambient light, and changes states of a liquid crystal material layer so as to control the reflectance of ambient light, thereby displaying images. The reflective liquid crystal display can achieve low power consumption, a thinner display, and light weight, and is thus used as, for example, a display device of a portable electronic apparatus. In addition, for example, as disclosed in JP-A-2005-148424, there has been proposed a liquid crystal display of a so-called area ratio grayscale method in which each pixel (each subpixel in color display) has a set of reflective electrodes, a voltage applied to the set of reflective electrodes is controlled for each reflective electrode so as to vary the area of a region provided for display, thereby performing grayscale display.

SUMMARY

In the reflective liquid crystal display, typically, a reflective electrode or the like for reflecting ambient light is not disposed in a region between pixels which are adjacent. Since ambient light incident on a region of portions in which a reflective electrode or the like is not disposed does not contribute to image display, usage efficiency of ambient light is reduced accordingly, and thus the luminance of a displayed image is reduced. Particularly, in a liquid crystal display of the area ratio grayscale method, there is a problem in that, since the reflective electrode is constituted by a plurality of sets of electrodes, a ratio of region portions in which the reflective electrode or the like is not disposed is increased, and thus usage efficiency of ambient light is further reduced.

It is therefore desirable to provide a reflective liquid crystal display capable of increasing usage efficiency of ambient light.

An embodiment of the present disclosure is directed to a liquid crystal display which is a reflective liquid crystal display displaying an image by controlling reflectance of ambient light, including a front substrate; a rear substrate; and a liquid crystal material layer disposed between the front substrate and the rear substrate, wherein the rear substrate is provided with a plurality of reflective electrodes formed on a surface opposite to the liquid crystal material layer, and a specular light reflecting member reflecting ambient light which is directed to a rear surface side of the rear substrate through a gap between the adjacent reflective electrodes toward the front substrate side.

In the liquid crystal display the rear substrate is provided with a plurality of reflective electrodes formed on a surface opposite to the liquid crystal material layer, and a specular light reflecting member reflecting ambient light which is directed to a rear surface side of the rear substrate through a gap between the adjacent reflective electrodes toward the front substrate side. Therefore, light passing through the gap between the reflective electrodes also contributes to image display, and thus usage efficiency of ambient light is raised. Thereby, it is possible to increase the luminance of a displayed image.

Additional features and advantages are described herein, and will be apparent from the following Detailed Description and the figures.

DETAILED DESCRIPTION

Figure 1:
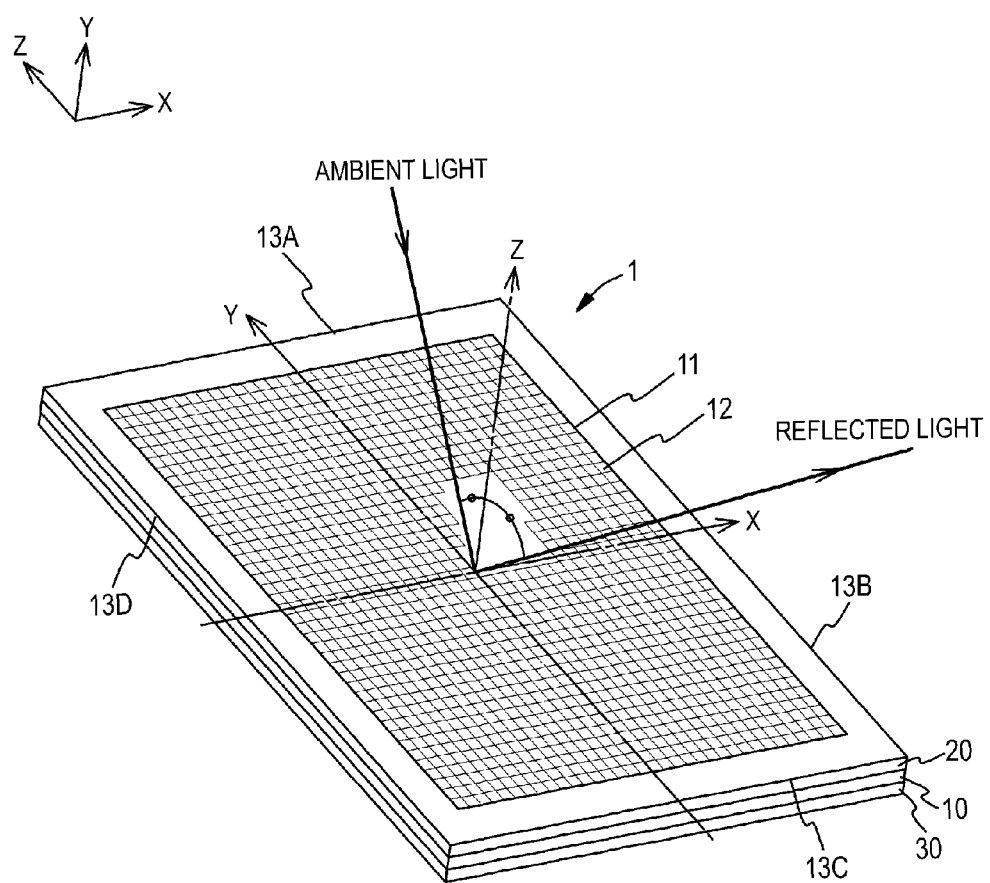
FIG. 1 is a schematic perspective view of a reflective liquid crystal display according to a first embodiment.

Hereinafter, the present disclosure will be described based on embodiments with reference to the drawings. The present disclosure is not limited to the embodiments, and various numerical values or materials in the embodiments are examples. In the following description, the same constituent elements or constituent elements having the same function are given the same reference numerals, and repeated description will be omitted. In addition, the description will be made in the following order.

1. Description of overall liquid crystal display according to embodiment of present disclosure
2. First embodiment
3. Second embodiment (and others)

Description of Overall Liquid Crystal Display According to Embodiment of Present Disclosure As described above, the liquid crystal display according to the embodiment of the present disclosure is a reflective liquid crystal display displaying an image by controlling reflectance of ambient light, including a front substrate, a rear substrate, and a liquid crystal material layer disposed between the front substrate and the rear substrate. The rear substrate is provided with a plurality of reflective electrodes formed on a surface opposite to the liquid crystal material layer, and a specular light reflecting member reflecting ambient light which is directed to a rear surface side of the rear substrate through a gap between the adjacent reflective electrodes toward the front substrate side.

The front substrate or the rear substrate may be made of a translucent material. The material forming the substrates may include, for example, glass, an acryl based resin, a polycarbonate resin (PC), an ABS resin, polymethylmethacrylate (PMMA), a polyarylate resin (PAR), or a polyethylene terephthalate resin (PET). The front substrate and the rear substrate may be made of the same material, or be made of different materials.

A material forming the liquid crystal material layer is not particularly restricted. As the material forming the liquid crystal material layer, a well-known material such as a nematic liquid crystal material may be used. A positive type liquid crystal material may be used, or a negative type liquid crystal material may be used. In addition, a so-called blue phase liquid crystal material may be used.

The liquid crystal display according to the embodiment of the present disclosure may perform monochrome display and color display. The pixel electrode itself may reflect light as a reflective electrode, or a combination of a transparent pixel electrode and the reflective electrode may reflect light. An operation mode of the liquid crystal display is not particularly restricted as long as there is no hindrance in display operation as the reflective type. For example, the liquid crystal display may be driven in a so-called VA mode or ECB mode. Further, a normally white mode or a normally black mode may be employed.

In the liquid crystal display according to the embodiment of the present disclosure including the above-described various preferable configurations, the specular light reflecting member may be disposed such that ambient light which is directed to the rear surface side of the rear substrate through the gap between the adjacent reflective electrodes is reflected toward the front substrate side. The light reflecting member may be disposed on the surface of the rear substrate on the liquid crystal material layer side; however, the light reflecting member is preferably disposed on the rear surface (the surface opposite to the liquid crystal material layer side) of the rear substrate from the viewpoint of facilitation of manufacturing or the like.

In the liquid crystal display according to the embodiment of the present disclosure including the above-described various preferable configurations, the light reflecting member preferably reflects light with a blue tone. Typically, in a reflective liquid crystal display, a color tone for white display has a tendency to show yellow. Therefore, the light reflecting member reflects light with a blue tone, and thereby the tendency for a color tone for white display to show a yellow tone can be canceled, and, contrast of black display can also be prevented from being decreased.

A configuration of the specular light reflecting member is not particularly restricted. The specular light reflecting member may be obtained by depositing metal such as aluminum on a base material including, for example, a PET film. In addition, in a case where the light reflecting member reflects light with a blue tone, a color filter or the like which transmits light with a blue tone therethrough may be formed. A configuration of the color filter is not particularly restricted, and may be a configuration of using dyes or pigments, or may be a configuration of using light interference of an interference film or the like. They may be formed using well-known materials.

In the liquid crystal display according to the embodiment of the present disclosure including the above-described various preferable configurations, a sheet-shaped anisotropic scattering member may be provided on the front substrate side. Thereby, it is possible to improve visibility of an image.

In this case, an in-plane direction region of the anisotropic scattering member may be formed as a region in which low refractive index regions and high refractive index regions are mixed, and the anisotropic scattering member may be configured to be disposed such that ambient light which is reflected on the rear substrate side is incident on the anisotropic scattering member and is scattered when emitted to the outside (emission scattering configuration).

In the emission scattering configuration, when ambient light incident from the outside is transmitted through the anisotropic scattering member and is directed to the rear substrate, the light is transmitted therethrough as it is without being scattered and arrives at the rear substrate. Therefore, since ambient light directed to the rear surface side of the rear substrate can be effectively reflected by the light reflecting member, it is possible to increase a usage rate of ambient light.

The anisotropic scattering member may be formed using a composition or the like including a photoreactive compound. For example, a base material including a composition expressing some extent of reflectance variations before and after photopolymerization is irradiated with light such as ultraviolet rays from a predetermined direction, thereby obtaining an anisotropic scattering member. As a material forming the composition, a material producing some extent of reflectance variations in a portion undergoing photoreaction and a portion not undergoing the photoreaction may be appropriately selected and used from a well-known photoreactive material such as polymer with functional groups of radical polymerization or cationic polymerization.

Alternatively, a base material including a composition in which a photoreactive compound and non-photoreactive polymer are mixed may be irradiated with light such as ultraviolet rays from a predetermined direction, thereby obtaining an anisotropic scattering member. The non-photoreactive polymer may be appropriately selected and used from a well-known material such as, for example, an acryl resin or a styrene resin.

The base material including the composition may be obtained by coating the composition on a film-shaped base made of, for example, a high polymer material using a well-known coating method.

An in-plane direction region of the anisotropic scattering member including the above-described composition may be formed as a region in which low refractive index regions and high refractive index regions are mixed. Typically, the anisotropic scattering member is formed such that the boundary between the low refractive index region and the high refractive index region forms a predetermined angle with respect to the thickness direction of the anisotropic scattering member. Depending on cases, this angle may be continuously varied in the in-plane direction.

In a case where the base material including the composition is irradiated with light, qualitatively, photoreaction of the composition progresses in a region close to the light irradiation side. Therefore, a surface irradiated with the light becomes a surface of which an extent of a refractive index variation around the boundary between the low refractive index region and the high refractive index region is relatively large, and, a surface on the opposite side becomes a surface of which an extent of a refractive index variation around the boundary between the low refractive index region and the high refractive index region is relatively small.

A refractive index difference between the low refractive index region and the high refractive index region is typically preferably 0.01 or more, more preferably 0.05 or more, and most preferably 0.10 or more in the vicinity of the surface of which an extent of a refractive index variation around the boundary between the low refractive index region and the high refractive index region is relatively large.

Figure 8A:
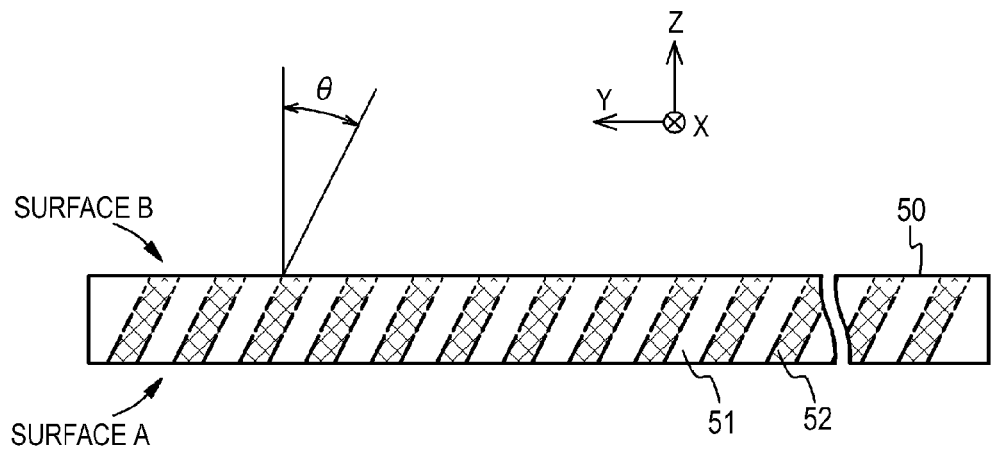
FIG. 8A is a schematic cross-sectional view illustrating a structure of an anisotropic scattering member.
Figure 8B:
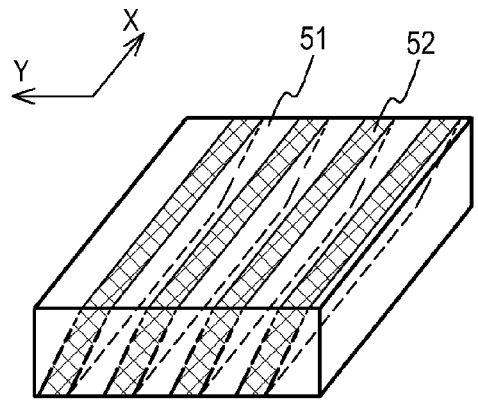
FIGS. 8B and 8C are schematic perspective views illustrating an arrangement of a low refractive index region and a high refractive index region in the anisotropic scattering member.
Figure 8C:
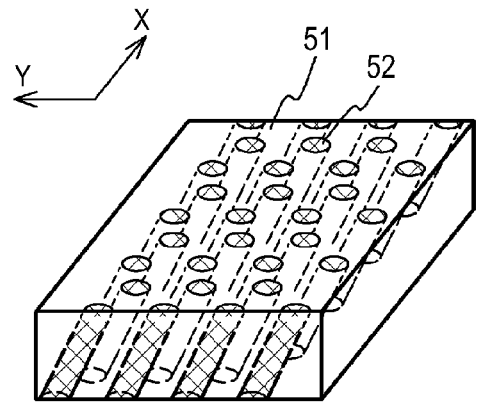

Although, depending on a material forming the anisotropic scattering member or a manufacturing method thereof, the portion undergoing photoreaction and the portion not undergoing photoreaction may respectively form louver-shape regions, for example, as shown in FIG. 8B described later, or may form a columnar region and a peripheral region surrounding the columnar region as shown in FIG. 8C described later.

In the liquid crystal display according to the embodiment of the present disclosure using the above-described anisotropic scattering member, there may be a configuration in which ambient light reflected on the rear substrate side is incident from a surface side of which an extent of a reflectance variation around a boundary between the low refractive index region and the high refractive index region is relatively large on the anisotropic scattering member, and is emitted from a surface side of which an extent of a reflectance variation around the boundary between the low refractive index region and the high refractive index region is relatively small. With this configuration, it is possible to reduce an iridescent color caused by light interference due to a fine structure where the low refractive index region and the high refractive index region are mixed.

In the liquid crystal display according to the embodiment of the present disclosure including the above-described various preferable configurations, the anisotropic scattering member may be formed by laminating a plurality of scattering members. For example, it is possible to minutely adjust scattering characteristics by changing characteristics of each scattering member.

Alternatively, in the liquid crystal display according to the embodiment of the present disclosure including the above-described various preferable configurations, the liquid crystal display may perform grayscale display using an area ratio grayscale method. For example, each pixel (in color display, each subpixel) may include a set of reflective electrodes of which the area is increased by about twice, and a voltage applied to the set of the reflective electrodes may be controlled for each reflective electrode so as to control the area of a region provided for display.

A shape of the liquid crystal display is not particularly restricted, and may be a transversely long rectangular shape or a longitudinally long rectangular shape. When the number M×N of pixels of the liquid crystal display is indicated by (M,N), for example, in a case of the transversely long rectangular shape, several resolutions for image display, such as, (640,480), (800,600), and (1024,768) are exemplified as a value of (M,N), and, in a case of the longitudinally long rectangular shape, resolutions obtained by exchanging the values are exemplified, but the number thereof is not limited to these values.

A driving circuit driving the liquid crystal display may include various circuits. They may be formed using well-known circuit elements.

A variety of conditions shown in the present specification are satisfied in a case of being substantially established as well as in a case of being strictly established. Presence of a variety of unevenness occurring in design or manufacturing is allowed.

First Embodiment

The first embodiment of the present disclosure relates to a liquid crystal display.

Figure 2:
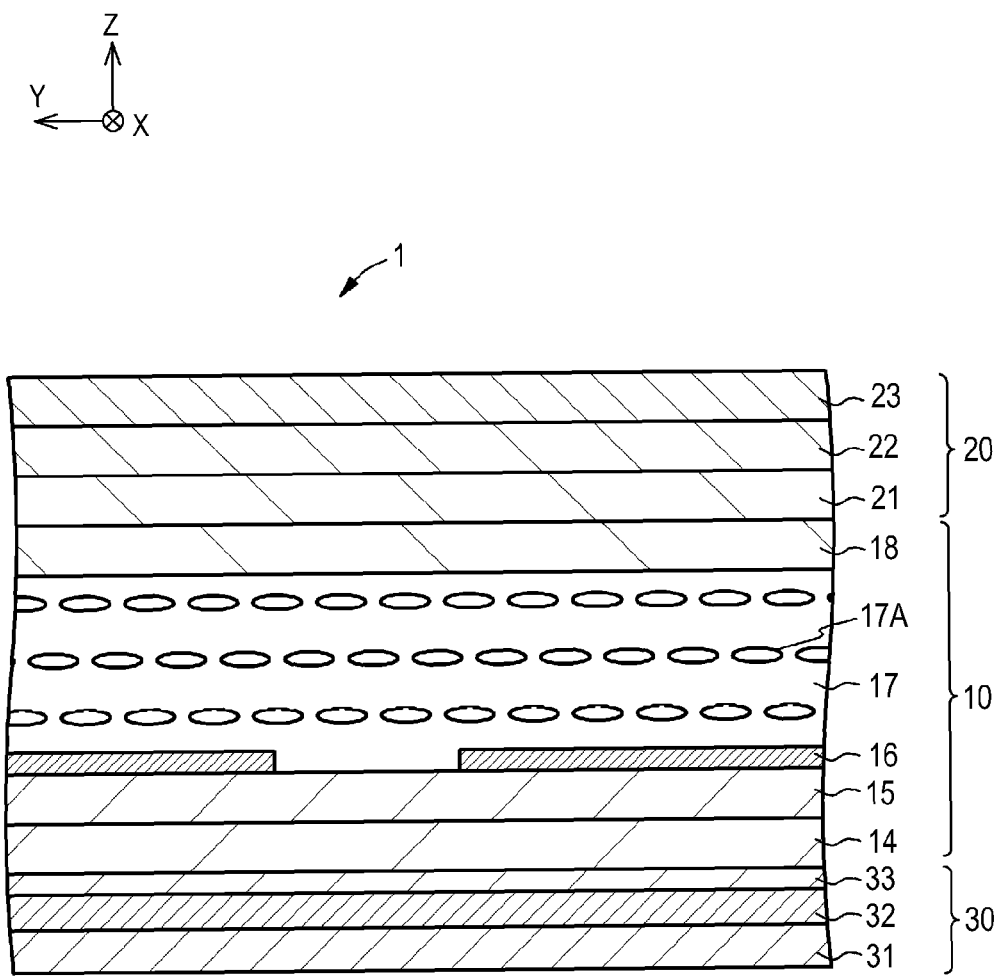
FIG. 2 is a schematic cross-sectional view of the liquid crystal display.

FIG. 1 is a schematic perspective view of a liquid crystal display according to the first embodiment. FIG. 2 is a schematic cross-sectional view of the liquid crystal display.

The liquid crystal display 1 is a reflective liquid crystal display having a display region 11 in which pixels 12 are arranged. The liquid crystal display 1 is driven by driving circuits and the like (not shown). Ambient light such as, for example, sunlight or illumination light is incident on the display region 11. For convenience of the description, the display region 11 is set to be parallel to the X-Y plane, and a direction where an image is observed is set to +Z direction. The description will be made assuming that the ambient light is incident on the display region 11 with a predetermined polar angle (for example, 30 degrees) from a direction of the azimuth 90 degrees, but this is only an example.

The liquid crystal display 1 has a rectangular shape, and sides thereof are indicated by the reference numerals 13A, 13B, 13C and 13D. The side 13C is a front side, and the side 13A is a side opposite to the side 13C. For example, the sides 13A and 13C are about 12 [cm], and the sides 13B and 13D are about 16 [cm], but the lengths thereof are not limited to these values.

As shown in FIG. 2, the liquid crystal display 1 includes a front substrate 18, a rear substrate 14, and a liquid crystal material layer 17 disposed between the front substrate 18 and the rear substrate 14. The reference numeral 17A schematically indicates liquid crystal molecules forming the liquid crystal material layer 17. The liquid crystal material layer 17 is provided at such a thickness where the liquid crystal material layer 17 functions as a ½ wavelength plate if light reciprocates under a predetermined condition, using spacers and the like (not shown). The reference numeral 10 shown in FIG. 1 indicates a portion including the front substrate 18, the rear substrate 14, and the liquid crystal material layer 17 disposed between and the front substrate 18 and the rear substrate 14 in the liquid crystal display 1. Similarly, the reference numeral 20 shown in FIG. 1 indicates a portion including a ¼ waveform plate 21, a ½ waveform plate 22, and a polarization plate 23 in the liquid crystal display 1.

As shown in FIG. 2, the rear substrate 14 is provided with a plurality of reflective electrodes 16 formed on a surface opposite to the liquid crystal material layer 17, and a specular light reflecting member 30 reflecting ambient light which is directed to the rear surface side of the rear substrate 14 through a gap between the adjacent reflective electrodes 16 toward the front substrate 18 side.

For example, a planarization film 15 made of a polymer material such as an acryl resin is formed on the rear substrate 14 made of a glass material, and the reflective electrodes (pixel electrodes) 16 made of a metal material such as aluminum is formed thereon.

A surface of the reflective electrode 16 is formed in a specular shape. For example, an element such as a TFT is connected to the reflective electrode 16 in order to control electrical connection between signal lines for supplying an image signal and the reflective electrode 16. In addition, in FIG. 2, TFTs, various wires such as signal lines or scanning lines for controlling conduction states of the TFTs, a common electrode or color filters provided on the front substrate 18, an alignment layer for defining an initial alignment state of the liquid crystal material layer 17, and the like are not shown. This is also the same for the other drawings.

The light reflecting member 30 has a film shape, and is formed by sequentially laminating a reflective film 32 made of metal such as aluminum and a blue filter layer 33 on a base 31 including, for example, a PET film. The light reflecting member 30 reflects light with a blue tone. The blue filter layer 33 and the rear surface of the rear substrate 14 are adhered to each other by a sticky layer (not shown).

The ambient light incident from the outside is linearly polarized in a predetermined direction by the polarization plate 23, in the ½ waveform plate 22, and is then circularly polarized by the ¼ waveform plate 21. The combination of the ½ waveform plate 22 and the ¼ waveform plate 21 functions as a wideband ¼ waveform plate. The ambient light which has been circularly polarized is transmitted through the liquid crystal material layer 17 and is reflected by the reflective electrode 16. The reflected ambient light is transmitted through the liquid crystal material layer 17, further transmitted through the ¼ waveform plate 21 and the ½ waveform plate 22, arrives at the polarization plate 23, and is emitted toward the outside. It is possible to control an amount where ambient light reflected by the reflective electrode 16 is transmitted through the polarization plate 23 by controlling a voltage applied to the reflective electrode 16 or the like so as to control an alignment state of the liquid crystal molecules 17A in the liquid crystal material layer 17.

Figure 3A:
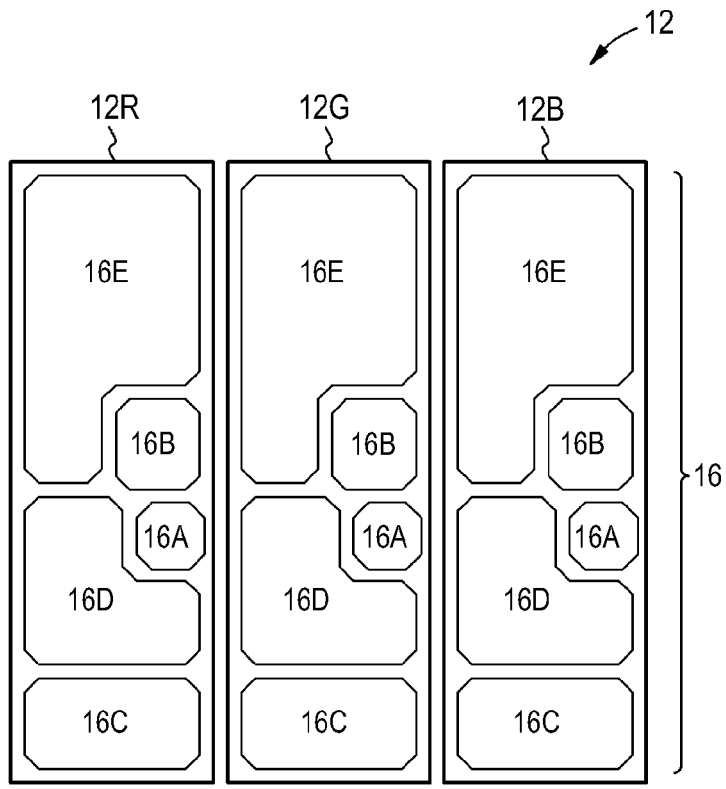
FIG. 3A is a schematic plan view illustrating a structure of a pixel.
Figure 3B:
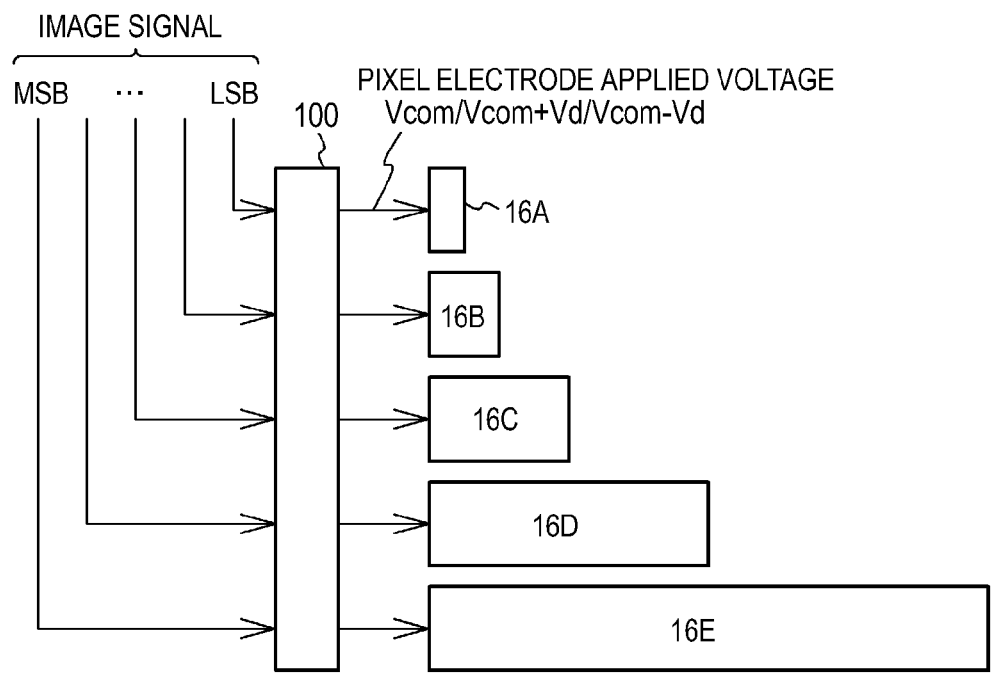
FIG. 3B is a schematic diagram illustrating a method of controlling a voltage applied to a reflective electrode.

FIG. 3A is a schematic plan view illustrating a structure of the pixel. FIG. 3B is a schematic diagram illustrating a method of controlling a voltage applied to the reflective electrode.

As shown in FIG. 3A, the pixel 12 includes a set of red display subpixel 12R, a green display subpixel 12G, and a blue display subpixel 12B. The liquid crystal display 1 performs grayscale display using an area ratio grayscale method. For this reason, the reflective electrodes 16 of each subpixel include a set of electrodes of which the area is increased by about twice. FIG. 3A shows an example of the case of including a set of five electrodes 16A, 16B, 16C, 16D and 16E. Voltages are applied to the electrodes 16A, 16B, 16C, 16D and 16E are controlled, for example, depending on values of corresponding bits of a digitalized image signal.

With reference to FIG. 3B, a description will be made of a configuration of a case where control is performed based on, for example, an image signal of 5 bits. The electrode 16E of which the area is the largest is controlled based on MSB of the image signal, and, as the area is decreased, the electrodes are controlled based on lower bits. The electrode 16A of which the area is the smallest is controlled based on LSB of the image signal. Specifically, one of, for example, a voltage $V_{com}$ with the same value as a voltage applied to the common electrode, a voltage $V_{com}+V_d$ with a positive polarity, and a voltage $V_{com}-V_d$ with a negative polarity is applied to each electrode according to a value of a corresponding bit of the image signal from a driving circuit 100. Thereby, polarity inversion driving is performed, for example, for each frame.

A voltage applied to each of the electrodes 16A, 16B, 16C, 16D and 16E is controlled, and thereby it is possible to control the area of a region provided for display. In addition, in the following description, in a case where it is not necessary to differentiate the electrodes 16A, 16B, 16C, 16D and 16E from each other, they are simply referred to as a reflective electrode 16.

Next, for better understanding of the present disclosure, behaviors of ambient light incident on the liquid crystal display will be described through comparison of a liquid crystal display according to a reference example which uses a light reflecting member with a scattering property instead of the specular light reflecting member 30 with the liquid crystal display according to the first embodiment.

Figure 4:
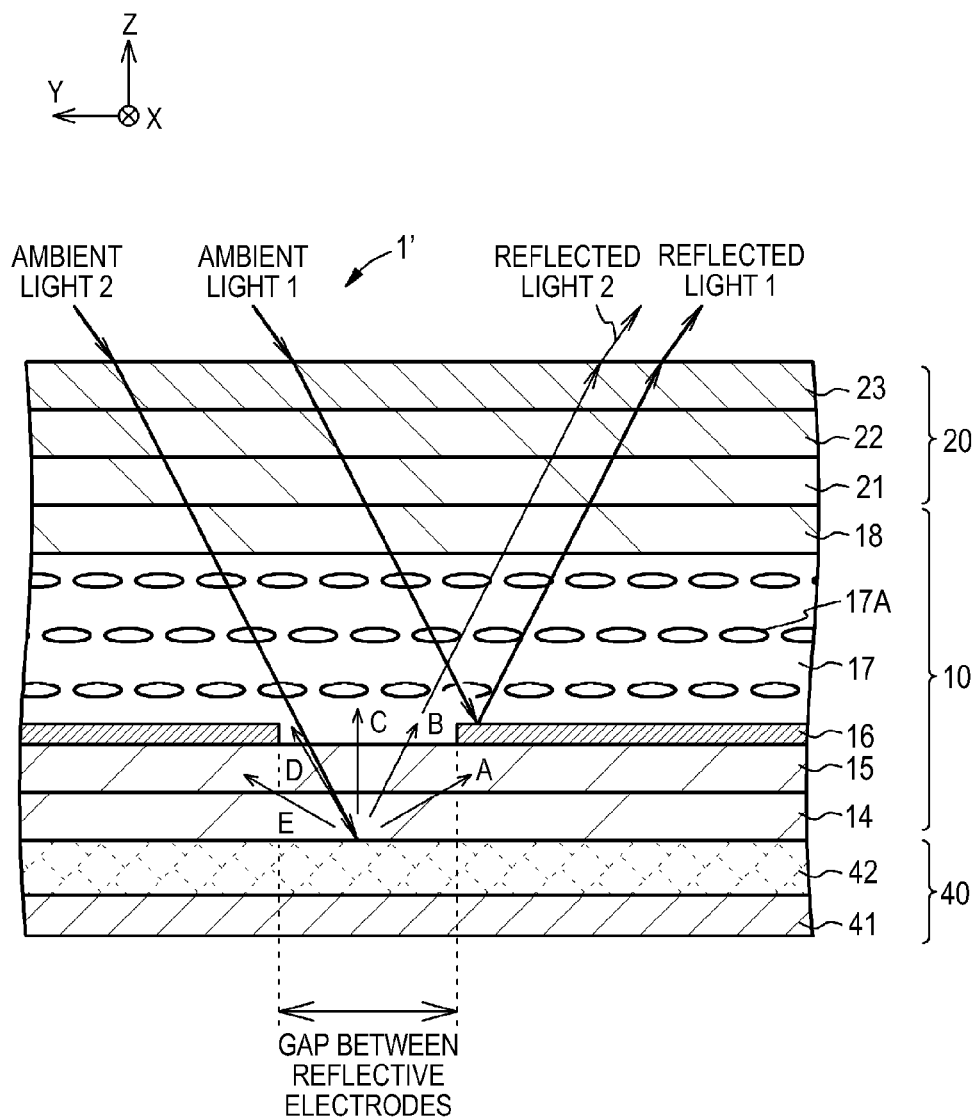
FIG. 4 is a schematic cross-sectional view illustrating reflection of ambient light in a liquid crystal display according to a reference example.
Figure 5:
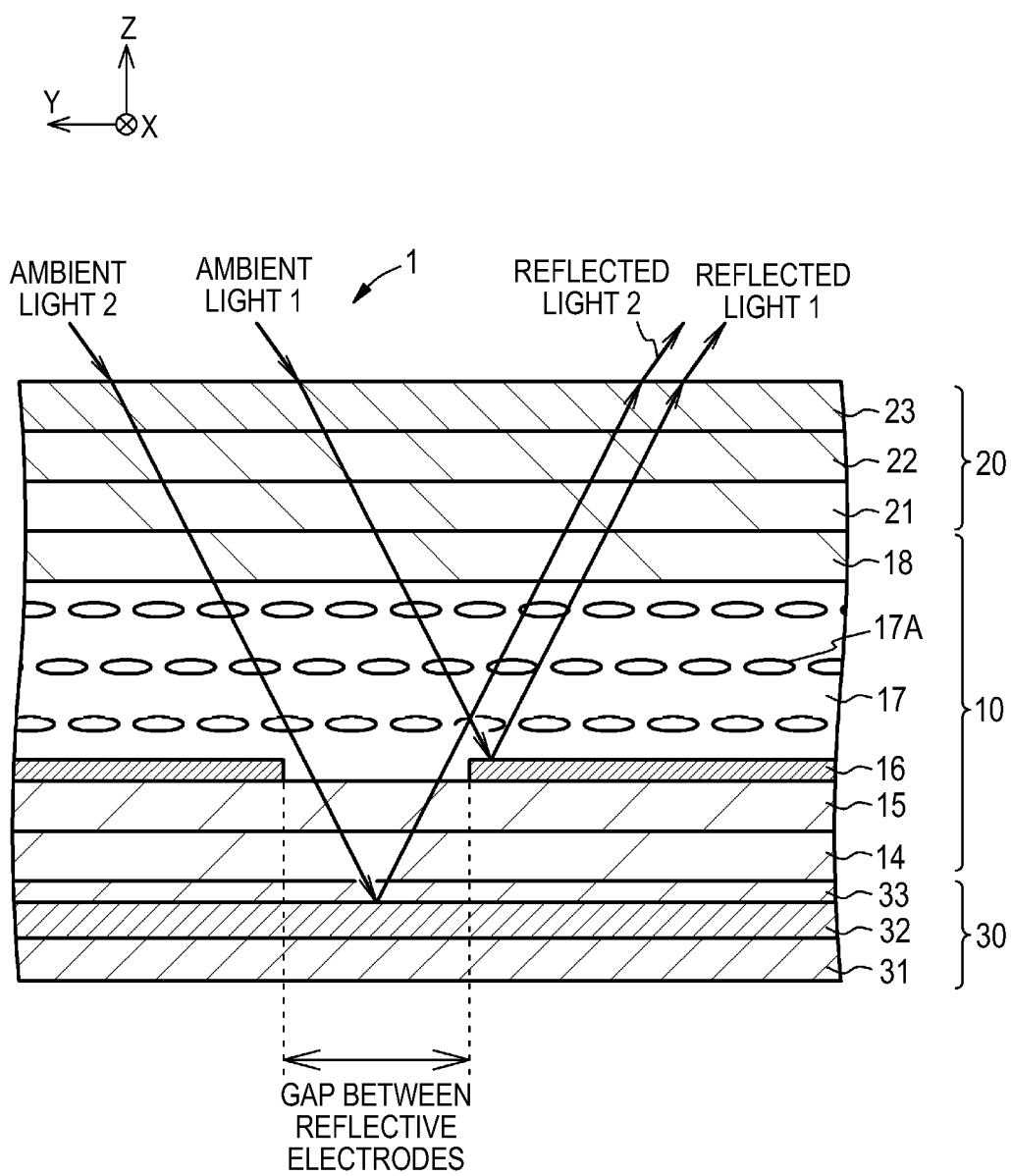
FIG. 5 is a schematic cross-sectional view illustrating reflection of ambient light in the liquid crystal display according to the first embodiment.

FIG. 4 is a schematic cross-sectional view illustrating reflection of ambient light in the liquid crystal display according to the reference example. FIG. 5 is a schematic cross-sectional view illustrating reflection of ambient light in the liquid crystal display according to the first embodiment.

As shown in FIG. 4, in the liquid crystal display 1' according to the reference example, a light reflecting member 40 with a scattering property is used instead of the specular light reflecting member 30. The light reflecting member 40 with a scattering property is formed by laminating a white material layer 42 on a base 41 including, for example, a PET film. The white material layer 42 and the rear surface of the rear substrate 14 are adhered to each other by a sticky layer (not shown).

In a case where ambient light is incident on the liquid crystal display 1', as shown in FIG. 4, ambient light 1 incident on the reflective electrodes 16 is reflected by the reflective electrode 16 as it is and then becomes reflected light 1. On the other hand, ambient light 2 which is directed to the rear surface side of the rear substrate 14 through the gap between the adjacent reflective electrodes 16 is incident on the white material layer 42, and then is scattered in an isotropic manner. In FIG. 4, the light beams which are scattered in an isotropic manner are indicated by the reference numerals A, B, C, D and E.

For example, in a case where an image observer observes the liquid crystal display 1' from a direction where the reflected light 1 travels, the light beam indicated by the reference numeral B traveling in the same direction as the reflected light 1 among the light beams scattered by the white material layer 42 becomes reflected light 2 and thus contributes to image display. However, the other light beams A, C, D and E do not contribute to image display. In other words, it is possible to use only some of the ambient light 2 directing to the rear surface side of the rear substrate 14 through the gap between the adjacent reflective electrodes 16.

On the other hand, as shown in FIG. 5, in the liquid crystal display 1 according to the first embodiment, a large amount of the ambient light 2 directing to the rear surface side of the rear substrate 14 through the gap between the adjacent reflective electrodes 16 is reflected by the specular light reflecting member 30 and becomes reflected light 2. As is clear from the comparison of FIG. 4 with FIG. 5, in the liquid crystal display 1, it is possible to use a large amount of the ambient light 2 directing to the rear surface side of the rear substrate 14 through the gap between the adjacent reflective electrodes 16, and thus usage efficiency of ambient light is improved.

In addition, typically, in a reflective liquid crystal display, a color tone for white display has a tendency to show yellow, but the liquid crystal display 1 can cancel the tendency.

As described above, the light reflecting member 30 reflects light with a blue tone. Therefore, even if an image displayed by the reflected light 1 has a yellow tone, an image by the reflected light 2 has a blue tone, and thus the tendency for a color tone for white display to show a yellow tone can be canceled, and, contrast of black display can also be prevented from being decreased.

Second Embodiment

The second embodiment of the present disclosure also relates to a liquid crystal display.

The liquid crystal display according to the second embodiment is different from the liquid crystal display according to the first embodiment in that a sheet-shaped anisotropic scattering member is provided on the front substrate side. The second embodiment has the same configuration as the first embodiment except for the above-described difference.

Figure 6:
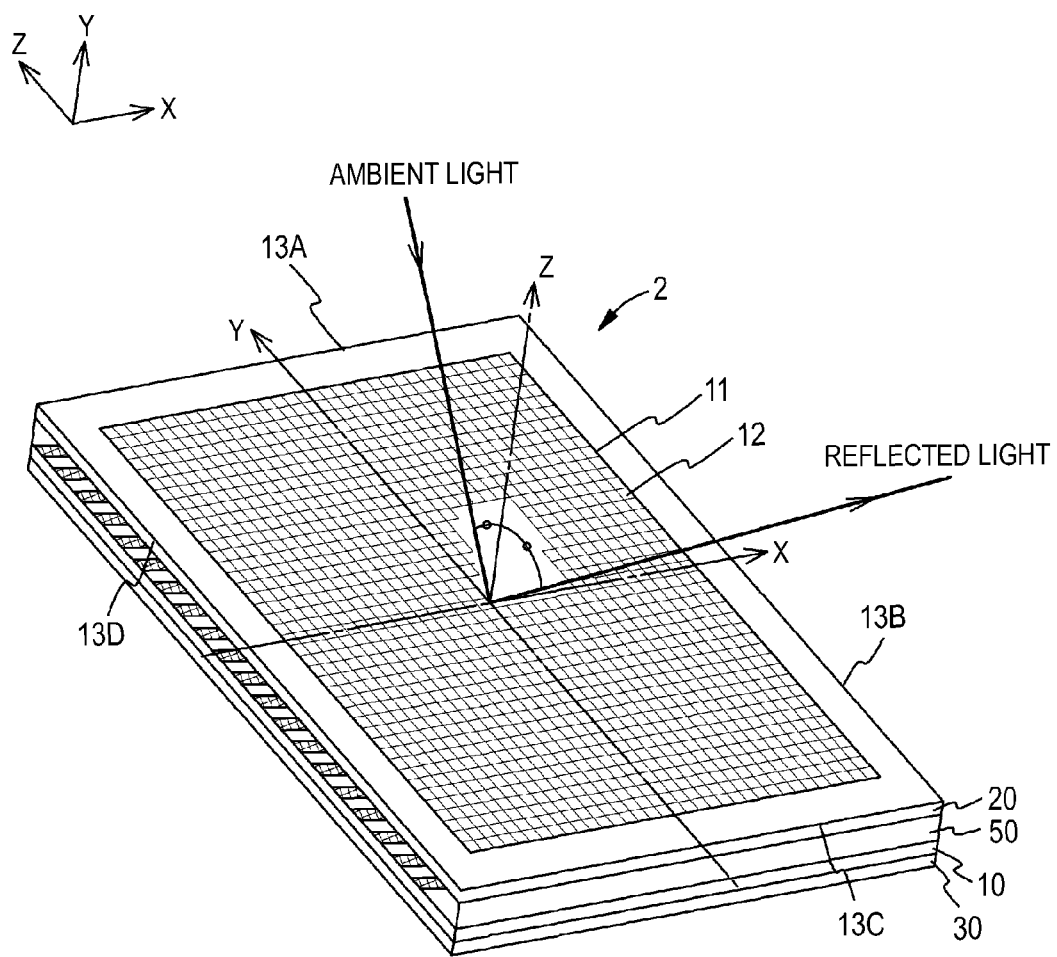
FIG. 6 is a schematic perspective view of a reflective liquid crystal display according to a second embodiment.
Figure 7:
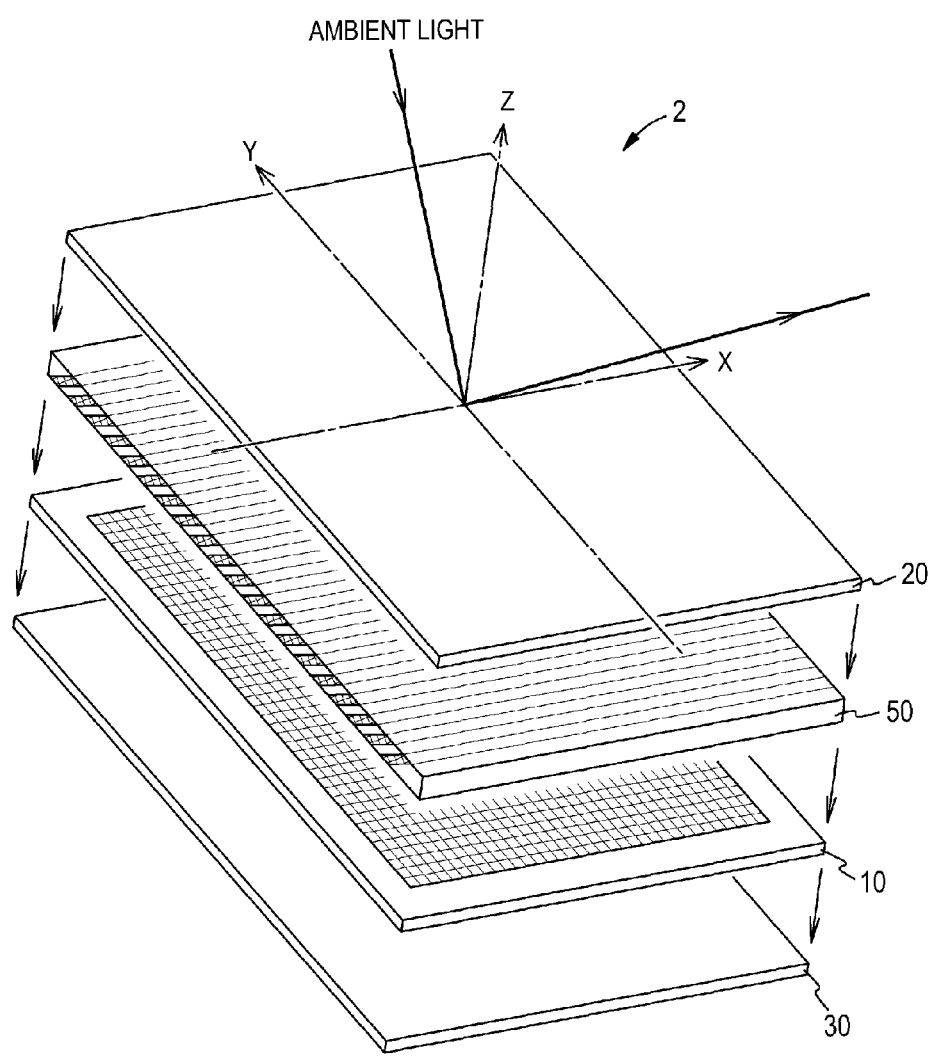
FIG. 7 is a schematic exploded perspective view illustrating the liquid crystal display according to the second embodiment.

FIG. 6 is a schematic perspective view of a reflective liquid crystal display according to the second embodiment. FIG. 7 is a schematic exploded perspective view illustrating the liquid crystal display according to the second embodiment.

Figure 11:
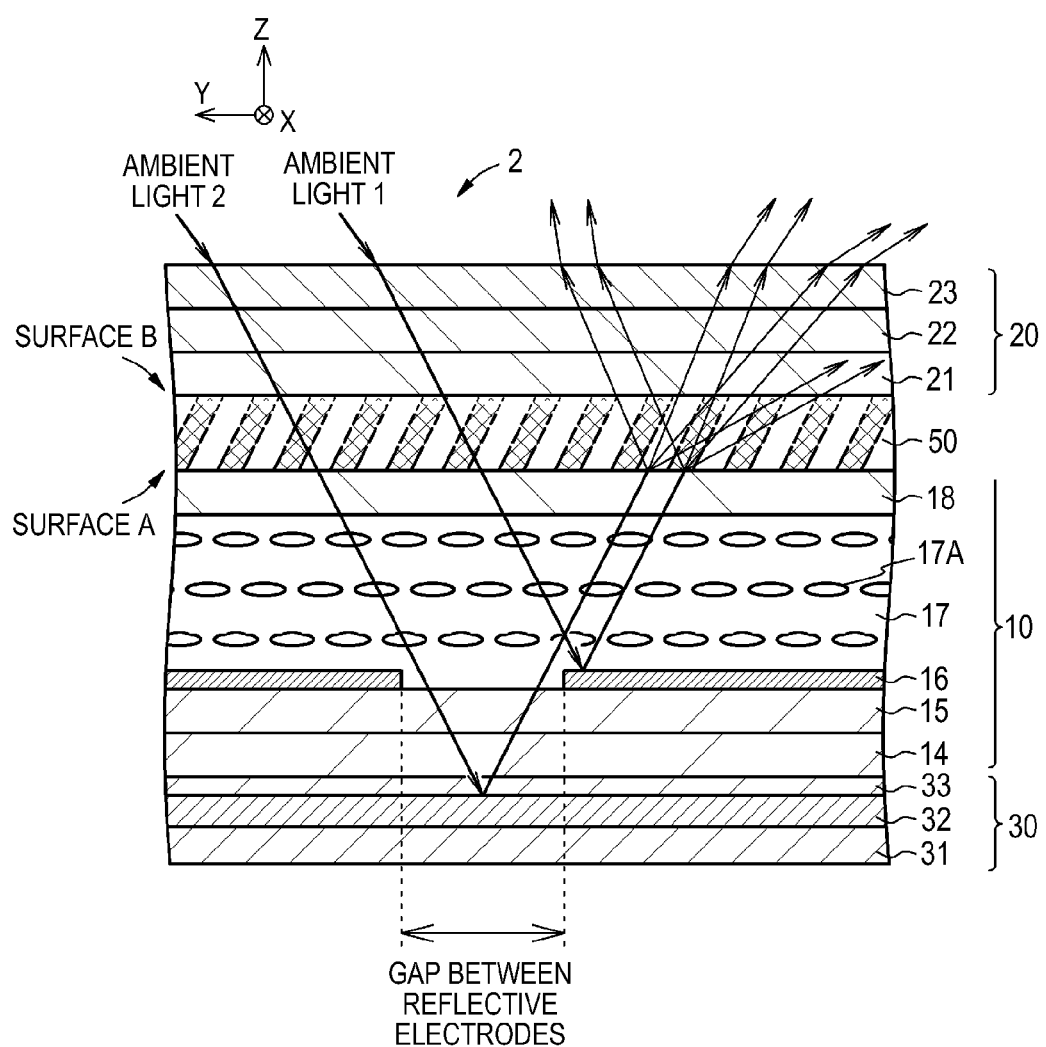
FIG. 11 is a schematic cross-sectional view illustrating reflection of ambient light in the liquid crystal display according to the second embodiment.

As shown in FIGS. 6 and 7, the liquid crystal display 2 includes a sheet-shaped anisotropic scattering member 50. The anisotropic scattering member 50 is disposed between the portion indicated by the reference numeral 10 and the portion indicated by the reference numeral 20 described in the first embodiment. The anisotropic scattering member 50 is disposed on the front substrate 18 side, more specifically, between the front substrate 18 and the ¼ waveform plate 21 as shown in FIG. 11 described later.

FIG. 8A is a schematic cross-sectional view illustrating a structure of the anisotropic scattering member. FIGS. 8B and 8C are schematic perspective views illustrating an arrangement of a low refractive index region and a high refractive index region in the anisotropic scattering member.

The anisotropic scattering member 50 has a sheet shape (film shape) with the thickness of, for example, 0.02 to 0.5 [mm]. Although a detailed description is made referring to FIG. 11, the anisotropic scattering member 50 is disposed such that a direction where scattering characteristics are the maximum is aligned with a normal observing direction.

As shown in FIG. 8A, an in-plane direction region of the anisotropic scattering member 50 is formed as a region in which low refractive index regions 51 and high refractive index regions 52 are mixed, for example, in micron order. Further, for simplicity of illustration, in FIGS. 8A to 8C, a transparent film and the like which form a base of the anisotropic scattering member 50 are not shown.

The anisotropic scattering member 50 is formed using a composition or the like including a photoreactive compound. For example, as shown in FIG. 8B, the anisotropic scattering member 50 may have a configuration in which the low refractive index regions 51 and the high refractive index regions 52 are formed in a louver shape, and, as shown in FIG. 8C, the anisotropic scattering member 50 may have a configuration in which the low refractive index regions 51 and the high refractive index regions 52 form columnar regions and peripheral regions surrounding them. FIG. 8C shows an example of the case where, for example, a composition portion having undergone photoreaction has a high refractive index in a columnar region form.

FIG. 8B shows that the width of each of the low refractive index regions 51 in the thickness direction or the width of each of the high refractive index regions 52 in the thickness direction is constant, but this is only an example. Similarly, FIG. 8C shows that the shapes of the column regions are the same, but this is also only an example.

As shown in FIGS. 8A to 8C, in the anisotropic scattering member 50, the low refractive index regions 51 and the high refractive index regions 52 are formed in a tilt direction such that a boundary between the low refractive index region 51 and the high refractive index region 52 forms an angle θ with respect to the thickness direction (Z direction) of the anisotropic scattering member 50. The angle θ is set to an appropriately preferable value depending on the specification of the anisotropic scattering member 50. Depending on cases, the angle θ may be 0 degrees.

For convenience of description, here, the low refractive index regions 51 and the high refractive index regions 52 are formed in a louver shape as shown in FIG. 8B, and a direction where the louver-shape regions extend is set to be parallel to the X direction. In addition, a description will be made assuming that the high refractive index region 52 is a region where a base material produces photoreaction, but this is only an example. A region where a base material produces photoreaction may be the low refractive index region 51.

Figure 9A:
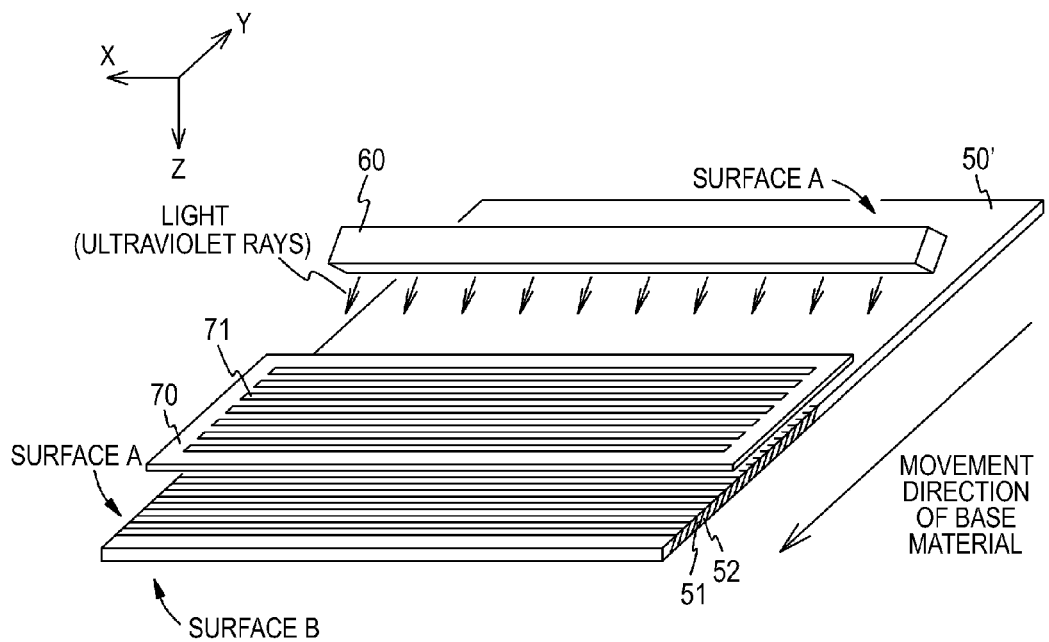
FIGS. 9A and 9B are schematic diagrams illustrating a manufacturing method of the anisotropic scattering member.

A manufacturing method of the anisotropic scattering member 50 will be described. As shown in FIG. 9A, the anisotropic scattering member 50 may be manufactured by a light irradiation device 60 obliquely applying light to a base material 50' in which a photoreactive composition is coated on a base such as, for example, a PET film, via a mask 70 having openings 71. In addition, depending on cases, light may be applied without the mask 70. Of the surfaces of the base material 50', a surface on a side to which light is applied from the light irradiation device 60 is indicated by a surface A, and a surface on an opposite side is indicated by a surface B.

Figure 9B:
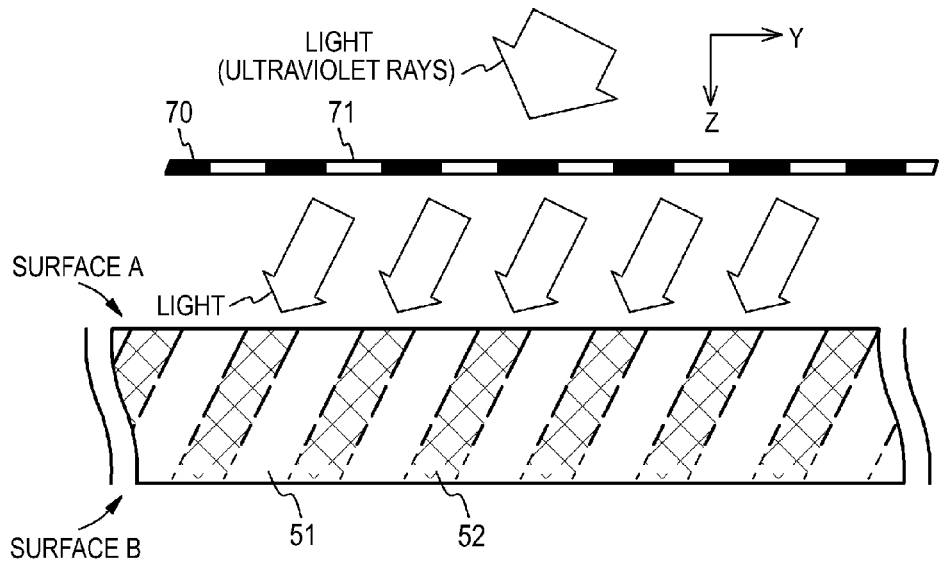

Due to influence such as diffraction of light or light absorption by the composition, qualitatively, photoreaction of the composition progresses in a region close to the light irradiation side. Therefore, as shown in FIG. 9B, the surface A to which the light is applied becomes a surface of which an extent of a refractive index variation around the boundary between the low refractive index region 51 and the high refractive index region 52 is relatively large, and, the surface B on the opposite side becomes a surface of which an extent of a refractive index variation around the boundary between the low refractive index region 51 and the high refractive index region 52 is relatively small.

Here, with reference to FIGS. 10A and 10B, a description will be made of a difference between a case where ambient light is incident from the surface A side of the anisotropic scattering member 50 and a case where ambient light is incident from the surface B side.

Figure 10A:
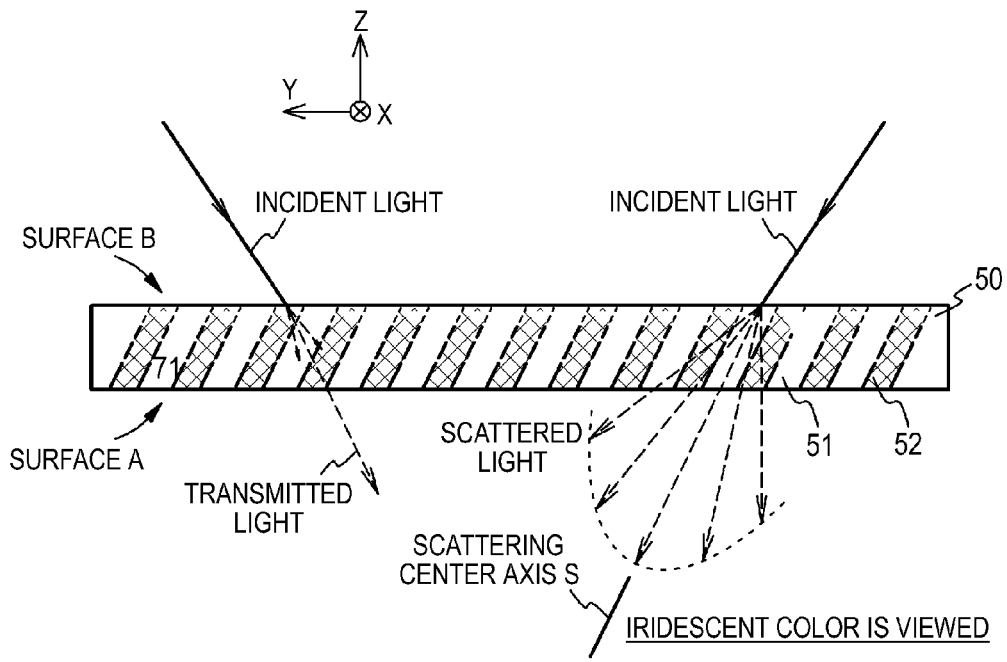
FIGS. 10A and 10B are schematic diagrams illustrating a relationship between incident light and scattered light in the anisotropic scattering member.
Figure 10B:
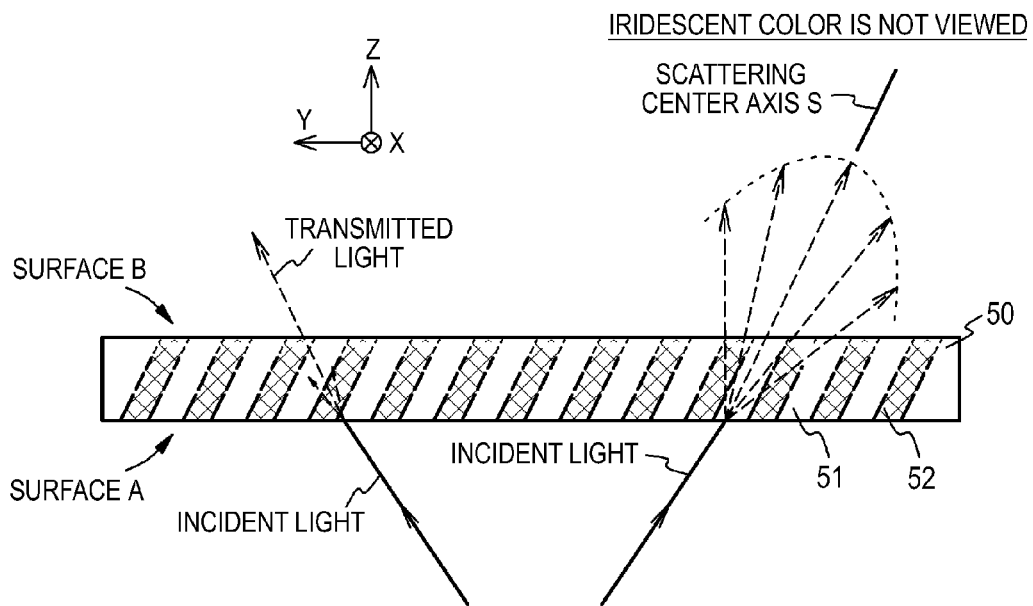

As shown in FIGS. 10A and 10B, in a case where, in the anisotropic scattering member 50, light is incident from a direction substantially following the direction where the boundary between the low refractive index region 51 and the high refractive index region 52 extends, the light is scattered and is emitted. On the other hand, light is incident from a direction substantially perpendicular to the direction where the boundary between the low refractive index region 51 and the high refractive index region 52 extends, the light is transmitted as it is.

As shown in FIG. 10A, in a case where it is incident from the surface B side and is scattered when emitted from the surface A side, the light is emitted from the surface of which an extent of a refractive index variation around the boundary between the low refractive index region 51 and the high refractive index region 52 is relatively large, and thus an iridescent color caused by light interference due to the fine structure tends to be visible.

In contrast, as shown in FIG. 10B, in a case where light is incident from the surface A side and is scattered when emitted from the surface B side, the light is emitted from the surface of which an extent of a refractive index variation around the boundary between the low refractive index region 51 and the high refractive index region 52 is relatively small, and thus an iridescent color caused by light interference due to the fine structure is reduced.

In addition, a scattering center axis S (an axis where an anisotropic scattering characteristic of light which is incident centering thereon is substantially symmetrical; in other words, an axis which extends in an incident direction of most scattered light) of the anisotropic scattering member 50 is obliquely tilted with respect to the Z direction, but, qualitatively, it is considered that an axial direction thereof is a direction substantially following the extending direction of the low refractive index regions 51 and the high refractive index regions 52. Further, in this case, it is considered that the azimuth where the scattering center axis S is projected onto the X-Y plane is in a direction perpendicular to the direction where the louver-shape regions extend in the case shown in FIG. 8B, and is in a direction where, when the columnar region is projected onto the X-Y plane, a shadow thereof extends in the case shown in FIG. 8C. A plane including the scattering center axis S is parallel to the Y-Z plane.

The anisotropic scattering member 50 is disposed such that ambient light which is reflected on the rear substrate 14 side is incident on the anisotropic scattering member 50 and is scattered when emitted to the outside. In the second embodiment, ambient light reflected on the rear substrate 14 side is incident from a surface side of which an extent of a reflectance variation around the boundary between the low refractive index region 51 and the high refractive index region 52 is relatively large on the anisotropic scattering member 50, and is emitted from a surface side of which an extent of a reflectance variation around the boundary between the low refractive index region 51 and the high refractive index region 52 is relatively small.

Behaviors of light in the liquid crystal display 2 will be described with reference to FIG. 11.

FIG. 11 is a schematic cross-sectional view illustrating reflection of ambient light in the liquid crystal display according to the second embodiment.

As shown in FIG. 11, the ambient light incident from the outside is linearly polarized in a predetermined direction by the polarization plate 23, rotates its polarization plane by 90 degrees in the ½ waveform plate 22, and is then circularly polarized by the ¼ waveform plate 21. The ambient light which has been circularly polarized is incident from a direction substantially perpendicular to the direction where the boundary between the low refractive index region 51 and the high refractive index region 52 extends, and thus the light is transmitted through the anisotropic scattering member 50 as it is and is then transmitted through the liquid crystal material layer 17. The ambient light incident on the reflective electrode 16 is reflected by the reflective electrode 16. In addition, ambient light which is directed to the rear surface side of the rear substrate 14 through the gap between the adjacent reflective electrodes 16 is reflected by the light reflecting member 30. The reflected ambient light beams are transmitted through the liquid crystal material layer 17, are incident from the surface A side of the anisotropic scattering member 50, and are emitted from the surface B side. Since the light is incident from a direction substantially following the direction where the boundary between the low refractive index region 51 and the high refractive index region 52 extends, the light is scattered, but since the light is emitted from the surface of which an extent of a refractive index variation around the boundary between the low refractive index region 51 and the high refractive index region 52 is relatively small, an iridescent color caused by light interference due to the fine structure is reduced. Thereafter, the scattered light is transmitted through the ¼ waveform plate 21 and the ½ waveform plate 22, arrives at the polarization plate 23, and is emitted to the outside. It is possible to control an amount where ambient light reflected by the reflective electrode 16 is transmitted through the polarization plate 23 by controlling a voltage applied to the reflective electrode 16 or the like so as to control an alignment state of the liquid crystal molecules 17A in the liquid crystal material layer 17.

In the liquid crystal display 2, light is scattered in a predetermined direction by the anisotropic scattering member 50, and thus it is possible to further widen an observing range of the liquid crystal display than in the first embodiment.

Figure 12:
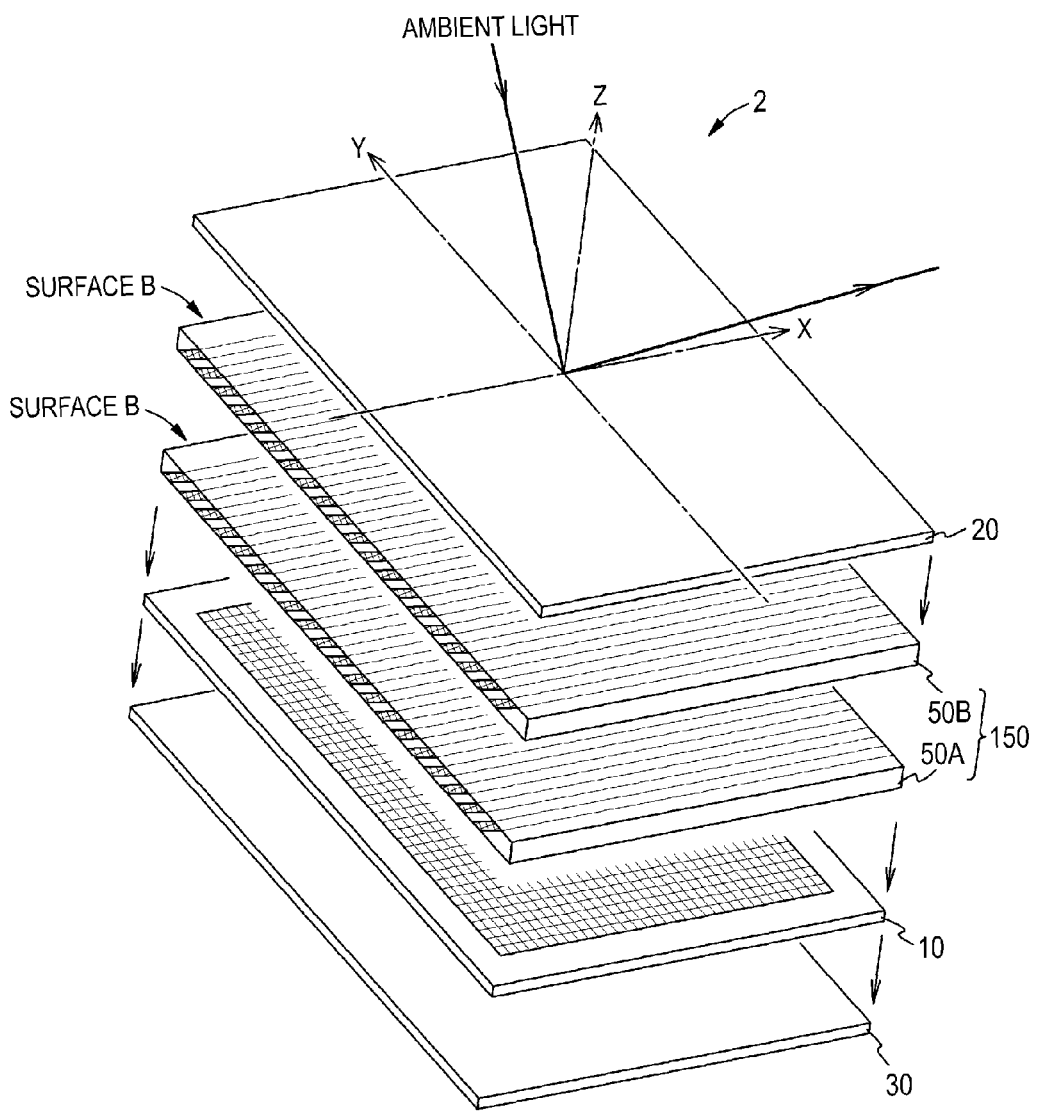
FIG. 12 is a schematic exploded perspective view illustrating a liquid crystal display according to a modified example.

In addition, in order to enlarge a scattering range or reduce an iridescent color, the anisotropic scattering member may have a structure formed by laminating a plurality of scattering members. FIG. 12 shows a schematic exploded perspective view of a liquid crystal display having an anisotropic scattering member with the above-described configuration.

In FIG. 12, an anisotropic scattering member 150 is formed by laminating scattering members 50A and 50B. The scattering members 50A and 50B basically have the same configuration as the anisotropic scattering member 50. For example, by giving some differences in directions of scattering center axes of the scattering members 50A and 50B, it is possible to adjust a diffusion range of light.

As above, although the embodiment of the present disclosure has been described in detail, the present disclosure is not limited to the above-described embodiment and may be variously modified based on the technical scope of the present disclosure.

For example, although, in the above-described embodiment, the anisotropic scattering member is disposed between the front substrate 18 and the ¼ waveform plate 21, this is only an example. A location at which the anisotropic scattering member is disposed may be appropriately determined depending on a design or a specification of the liquid crystal display.

In addition, the present disclosure may be implemented as the following configurations.

(1) A liquid crystal display which is a reflective liquid crystal display displaying an image by controlling reflectance of ambient light, including a front substrate; a rear substrate; and a liquid crystal material layer disposed between the front substrate and the rear substrate, wherein the rear substrate is provided with a plurality of reflective electrodes formed on a surface side opposite to the liquid crystal material layer, and a specular light reflecting member reflecting ambient light which is directed to a rear surface side of the rear substrate through a gap between the adjacent reflective electrodes toward the front substrate side.

(2) The liquid crystal display set forth in (1), wherein the light reflecting member is disposed on the rear surface of the rear substrate.

(3) The liquid crystal display set forth in (1) or (2), wherein the light reflecting member reflects light with a blue tone.

(4) The liquid crystal display set forth in any one of (1) to (3), wherein a sheet-shaped anisotropic scattering member is provided on the front substrate side.

(5) The liquid crystal display set forth in (4), wherein an in-plane direction region of the anisotropic scattering member is formed as a region in which low refractive index regions and high refractive index regions are mixed, and wherein the anisotropic scattering member is disposed such that ambient light reflected on the rear substrate side is incident on the anisotropic scattering member and is scattered when emitted to outside.

(6) The liquid crystal display set forth in (5), wherein ambient light reflected on the rear substrate side is incident from a surface side of which an extent of a reflectance variation around a boundary between the low refractive index region and the high refractive index region is relatively large on the anisotropic scattering member, and is emitted from a surface side of which an extent of a reflectance variation around the boundary between the low refractive index region and the high refractive index region is relatively small.

(7) The liquid crystal display set forth in any one of (4) to (6), wherein the anisotropic scattering member is formed by laminating a plurality of scattering members.

(8) The liquid crystal display set forth in any one of (1) to (7), wherein the liquid crystal display performs grayscale display using an area ratio grayscale method.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A liquid crystal display that is a reflective liquid crystal display displaying an image by controlling reflectance of ambient light, comprising:
a front substrate;
a rear substrate;
a liquid crystal material layer disposed between the front substrate and the rear substrate;
a planarization film formed on a front surface side of the rear substrate;
a plurality of reflective electrodes formed on the planarization film; and
a light reflecting member disposed on a rear surface side of the rear substrate,
wherein the reflective electrodes reflect, toward a front substrate side, ambient light that is initially directed to the front surface side of the reflective electrodes, and
wherein the light reflecting member is specular on the front surface side and allows the ambient light to be reflected toward the front surface side of the front substrate,
where the ambient light is initially directed from the front surface side of the front substrate to the rear surface side of the rear substrate and transmits sequentially through a gap between the adjacent reflective electrodes, the planarization film, and the rear substrate, and
wherein the ambient light reflected by the light reflecting member is directed toward the front surface side of the front substrate and transmits sequentially through the rear substrate, the planarization film, and the gap between the adjacent reflective electrodes.

2. The liquid crystal display according to claim 1, further comprising a sheet-shaped anisotropic scattering member that is provided on the front surface side of the front substrate.

3. The liquid crystal display according to claim 2, wherein an in-plane direction region of the anisotropic scattering member is formed as a region in which low refractive index regions and high refractive index regions are mixed, and
wherein the anisotropic scattering member is disposed such that ambient light reflected by the light reflective member or the reflective electrodes is incident on the anisotropic scattering member and is scattered when emitted to outside.

4. The liquid crystal display according to claim 3, wherein ambient light reflected by the light reflective member or the reflective electrodes is incident from a surface side of which an extent of a reflectance variation around a boundary between the low refractive index region and the high refractive index region is relatively large, on the anisotropic scattering member, and emitted from a surface side of which an extent of a reflectance variation around the boundary between the low refractive index region and the high refractive index region is relatively small.

5. The liquid crystal display according to claim 2, wherein the anisotropic scattering member is formed by laminating a plurality of scattering members.

6. The liquid crystal display according to claim 2, wherein
the ambient light is initially directed from the front surface side of the front substrate to the rear surface side of the rear substrate, transmitting sequentially through the sheet-shaped anisotropic scattering member, the front substrate, the gap between the adjacent reflective electrodes, the planarization film, and the rear substrate, and
the ambient light reflected by the light reflecting member is directed toward the front surface side of the front substrate, transmitting sequentially through the rear substrate, the planarization film, the gap between the adjacent reflective electrodes, and the front substrate and then scattering trough the sheet-shaped anisotropic scattering member.

7. The liquid crystal display according to claim 1, wherein the light reflecting member reflects light with a blue tone.

8. The liquid crystal display according to claim 1, wherein the liquid crystal display performs grayscale display using an area ratio grayscale method.

9. The liquid crystal display according to claim 1,
wherein light reflecting member comprises a metal reflective film and a blue filter layer, the blue filter layer is laminated on the rear surface side of the rear substrate, and
the metal reflective film is laminated on the rear surface side of the blue filter layer.

10. The liquid crystal display according to claim 1,
wherein the light reflecting member is configured to be viewed through the gap between the adjacent reflective electrodes in plan view from the front substrate side.

11. The liquid crystal display according to claim 1, wherein the light reflecting member is layered to cover an entire area of the rear surface side of the rear substrate.

* * * * *